United States Patent [19]

Piros

[11] Patent Number: 4,958,881
[45] Date of Patent: Sep. 25, 1990

[54] THEFT PROOF PROTECTIVE COVERING FOR PARKED VEHICLE

[76] Inventor: Ionel Piros, 4461 Mammoth Ave., Sherman Oaks, Calif. 91423

[21] Appl. No.: 359,645

[22] Filed: May 31, 1989

[51] Int. Cl.$^5$ .............................................. B60J 11/00
[52] U.S. Cl. ..................................... 296/98; 296/136; 160/370.2
[58] Field of Search .................... 296/98, 136, 95.1; 160/370.2; 150/166

[56] References Cited

U.S. PATENT DOCUMENTS

| | | | |
|---|---|---|---|
| 2,048,461 | 7/1936 | Mosgoffian | 296/136 |
| 2,213,601 | 9/1940 | White | 296/98 |
| 2,724,395 | 11/1955 | Valentine | 296/98 |
| 3,021,894 | 2/1962 | LaDue | 296/98 X |
| 3,050,075 | 8/1962 | Kaplan et al. | 296/98 |
| 3,785,697 | 1/1974 | Dabbs | 296/136 |
| 4,657,298 | 4/1987 | Yong O | 296/136 |
| 4,684,165 | 8/1987 | Becker | 296/136 |
| 4,718,711 | 1/1988 | Rabbit | 296/136 |
| 4,821,785 | 4/1989 | Rolan | 296/136 X |
| 4,834,446 | 5/1989 | Tung-Chow | 296/98 X |

FOREIGN PATENT DOCUMENTS

| | | | |
|---|---|---|---|
| 542700 | 11/1955 | Belgium | 296/136 |
| 222713 | 5/1987 | European Pat. Off. | 296/136 |
| 3245017 | 6/1984 | Fed. Rep. of Germany | 296/98 |
| 1316397 | 12/1963 | France | 296/136 |
| 568729 | 10/1984 | Japan | 296/136 |
| 2192599 | 1/1988 | United Kingdom | 296/98 |

Primary Examiner—Johnny D. Cherry
Assistant Examiner—Joseph D. Pape
Attorney, Agent, or Firm—Thomas I. Rozsa

[57] ABSTRACT

A protective vehicle cover which includes within its design a rotatable retaining element for retaining the protective cover within the trunk of the vehicle so that it is safety stored to prevent theft and further retained within the trunk to thereby eliminate any defacing of the exterior of the vehicle or any impairment of the aerodynamics of the vehicle when the vehicle is in motion. The present invention further relates to a protective vehicle cover which can be draped over the vehicle in a manner by which the protective cover is threaded through the gap between an the top rear of an open trunk lid and the rear upper body of the trunk and thereafter spread over the vehicle while the trunk lid is closed, to thereby provide a protective cover which has a portion extending into the locked trunk so that the vehicle cover cannot be removed or stolen and at the same time provides a complete covering for the vehicle. The anti-theft device comprises an interconnecting member which connects a portion of the interior surface of the protective cover and the rotatable retaining member in the trunk, to thereby prevent the vehicle cover from being lifted off and removed by a thief. The interconnecting member extends through the gap located between the top rear of the trunk body and the rear edge of the trunk lid and extends through this gap even when the lid is closed.

24 Claims, 2 Drawing Sheets

THEFT PROOF PROTECTIVE COVERING FOR PARKED VEHICLE

BACKGROUND OF THE INVENTION

1. Field of the Invention

The present invention relates to protective coverings for vehicles to protect the vehicle against dust during storage and against dust, dirt, bird droppings, animals such as cats and squirrels running on the vehicle, and adverse weather conditions when the vehicle is parked outdoors. The present invention also relates to improvements in protective vehicle covers to assist in carrying the protective cover in a folded condition within the vehicle when the protective cover is not in use and further to providing improvements in the manner in which the protective cover can be unwound into use. The present invention further relates to improvements in protective vehicle covers to make them theft proof.

2. Description of the Prior Art

The concept of a protective covering for vehicles is well known and numerous inventions have been conceived and patented which embody various improvements on the basic theme of providing a covering material such as cloth over a vehicle to protect it from dust, dirt, animals and weather conditions. The following patents represent the closest prior art of which the inventor is aware:

1. U.S. Pat. No. 2,712,845 issued to Lange in 1955 for "Protective Covering".
2. U.S. Pat. No. 2,751,977 issued to Pinkerton in 1956 for "One Man Automobile Cover".
3. U.S. Pat. No. 2,874,709 issued to Cohen et al in 1959 for "Vehicle Protective Cover".
4. U.S. Pat. No., 3,222,102 issued to Lucas in 1965 for "Vehicle Cover".
5. U.S. Pat. No. 3,563,594 issued to London in 1971 for "Retractable Flexible Car Body Protector".
6. U.S. Pat. No. 3,763,908 issued to Norman in 1973 for "Automobile Cover".
7. U.S. Pat. No. 3,785,697 issued to Dabbs in 1974 for "Portable Collapsible Garage".
8. U.S. Pat. No. 3,992,053 issued to Hrytzak et al in 1976 for "Sun Shield For Automobile".
9. U.S. Pat. No. 4,324,427 issued to Huang et al in 1982 for "Automobile Bumper With Adiabatic Device".
10. U.S. Pat. No. 4,596,418 issued to Koh in 1986 for "Vehicle Cover".
11. U.S. Pat. No. 4,732,421 issued to Ross et al. in 1988 for "Self-Storing, Retractable Automobile Cover".

In all of the above inventions, the general idea is to protect all or a portion of a vehicle, most particularly a car, through use of a protective covering which is draped over the vehicle so as to shield the vehicle from outside elements. The improvements in the various patents relate to the method by which the protective covering is housed on the vehicle and how it is folded over the vehicle and subsequently how it is removed and stored.

In U.S. Pat. No. 2,712,845 the cover is wound on a roller and is subsequently unwound to be draped over the vehicle. After use, the cover is rewound on the roller. The major flaw with this device is that rewinding the cover is a major chore and the user in most cases will simply fold the cover up after use and place it in the back seat of the vehicle or in the trunk. The second major flaw is that the cover can be easily removed with no effort, thereby subjecting it to be easily stolen.

In U.S. Pat. No. 2,751,977 the cover is wound and is unwound by unwinding the roller with the assistance of a crank. The ends of the cover are attached to the vehicle bumper through the use of strings. Once again, rewinding the cover is a chore and again the cover must be stored in a clumsily wound fashion in the vehicle when the cover is not in use. Also, the cover can be easily stolen by a thief cutting the strings and removing the cover.

In U.S. Pat. No. 2,874,709 the cover is enclosed within a structure attached to the roof of the vehicle. The cover is pulled down from the roof. Most users are unwilling to deface the roof of the vehicle with such a cover apparatus and further if left on the vehicle while the vehicle is in use, the apparatus lends substantial drag and wind resistance, thereby substantially reducing fuel economy.

In U.S. Pat. No. 3,222,102 the cover is attached to the emergency brake of the vehicle. The same problems as with previous inventions are present in this embodiment. The cover is cumbersome to wind and unwind. The road guard is reduced due to the dimensions of the enclosing box. Understanding the potential safety hazard if the cover containing box opens when the car is moving, the inventor connected the box lid with the emergency brake adding one more complication to the already complicated system.

In U.S. Pat. No. 3,563,594, the cover is mounted in a casing which is attached to the side of the vehicle and is unwound from the casing to cover a portion of the vehicle. The casing includes a roller with a spring actuated mechanism to rewind the cover. The device is cumbersome and is located at an inconvenient location adjacent and below a door on the vehicle. This prior art serves a different purpose since it covers just the door panel and only protects it against possible denting while the car is parked.

In U.S. Pat. No. 3,763,908, the cover is held in place on the vehicle by magnets. Once again, the cover is cumbersome to place over the vehicle and to remove from the vehicle and is cumbersome to store in the vehicle when not in use. In addition, the cover can be easily removed form the vehicle and therefore easily stolen.

In U.S. Pat. No. 3,785,697, the cover is mounted on a framework which itself is mounted on a pivotable framework which is housed in the truck of a car. There are several major problems with this prior art creation. The car with which it is used requires a trunk configuration wherein the trunk hinges are located at the rear of the trunk adjacent the rear bumper so that the trunk opens toward the rear of the vehicle. This type of hinge configuration is not used with present, day vehicles since it makes access to the trunk compartment difficult. The system occupies almost the full trunk capacity, leaving little room for luggage and other contents. To cover the car with the cover provided in this system requires the prior emptying of the trunk because any contents of the trunk would obstruct the maneuver of extending the cover supporting frame from the trunk over the car. In addition, since the pivotal framework can be caused to extend out of the trunk and thereafter the cover is unwound onto and over the vehicle, in addition to being cumbersome and unwieldy, it requires that the trunk must be left open so that the pivotal portion can extend out of the trunk. In modern day cars, the open trunk subjects the trunk light to go on, thereby draining the battery. In addition to the device itself being easily stolen, the open trunk is an invitation for the thief to steal the contents of the trunk. Therefore, the device is not practical.

In U.S. Pat. No. 3,992,053, the covering is a sun shield designed to cover the roof and front of the vehicle. The housing is mounted on the top of the trunk. The result is a device which adds an unsightly appearance to the vehicle, adds wind resistance and decreases the aerodynamics of the vehicle, and only covers a portion of the vehicle.

In U.S. Pat. No. 4,324,427, the cover is attached to a casing which is attached to the bumper of the automobile. The covering is unwound from the casing to cover the automobile. Once again, the casing is fully exposed and can be easily removed from the automobile and therefore easily stolen. In addition, the system implies changes in the bumper construction and therefore departs from the existing impact safety standards. The system is also very complicated and cumbersome.

In U.S. Pat. No. 4,596,418, the cover is held in a pocket within the trunk of a car and when removed from the trunk, is affixed to the pocket by strings. This device has several major disadvantages. The major problem with this invention, in addition to being cumbersome and unwieldy, is that the strings can extend out the back of the trunk so that the strings can be easily cut and the device easily stolen. In addition, another major problem with this system is that the application over the car and the folding of the cover is a difficult and messy operation to be performed by only one person. Folding the cover one would definitely dirty his or her hands and clothes, making this system far from being user friendly. Also by cutting the strings that go into the trunk the cover could be easily stolen.

In U.S. Pat. No. 4,732,421, the invention relates to a casing which is attached to the back of a vehicle and has a cover which can be unwound from the casing to cover the vehicle and can be rewound through a spring which winds the cover back into the casing. In addition to being unsightly, the major problem with the device is that it can be easily stolen.

Therefore, in general, the prior art discloses car covers which are made of various types of fabric tailored to protect the top and all four sides of the car. When applied over the car the protective cover is usually fixed to the car body through the use of strings, hooks or other devices connecting the cover hem to bumpers or other parts of the car body. Another method of holding the car cover in place is through the use of an elastic string or a normal string enclosed in the bottom hem of the car cover. To alleviate the difficulty of applying the cover over the car and removing the cover from the car, prior art covers provided a single piece of fabric spirally wound on a roller enclosed in a box which box is mounted either at the front or rear of the car.

In summary, the prior art devices all suffer from one or more of the following disadvantages. In some cases the large dimensions of the containing box would seriously alter the aerodynamics and the aesthetics of the car. Also when the box is mounted on the trunk lid, the rear vision is reduced and when mounted under the bumper the road guard is reduced, therefore altering not only the aerodynamics and aesthetics of the car but also the car safety. In other cases, trying to reduce the size of the containing box, the inventors proposed a reduction in the amount of fabric and consequently the protected area of the car was reduced. In some prior art inventions proposing the cover winding in a tube, the car cover width was limited by the length of the tube being smaller or equal to the width of the car. The cover would then protect only the top side of the car or with the aid of side flaps the side windows too.

Added to the above disadvantages, the rolling of the cover usually brings in contact the exterior face with the interior face of the cover and after a few days of use both faces will be dusty and dirty, defeating the very purpose of a cover; namely, protection against dirt.

In some prior art embodiments when the cover is housed in the trunk of the car, the device requires that the car lid be opened during use, thereby resulting in a wearing on the battery and further resulting in opening up the trunk for possible theft.

In every single case, the device is attached in a manner which allows the cover to be stolen. This is not a problem if the car itself is off the street and is behind a locked gate. But, in most applications this is not the case and therefore the cover, in every single prior art embodiment, can be easily stolen.

Therefore, a significant need exists for a novel protective vehicle cover which can be stored in an efficient manner, wound onto the car and unwound from the car in an efficient manner, and affixed in a manner which will make the vehicle cover theft proof.

SUMMARY OF THE PRESENT INVENTION

The present invention relates to a protective vehicle cover which includes within its design a housing member for retaining the protective cover within the trunk of the vehicle so that it is safely stored to prevent theft and further retained within the trunk to thereby eliminate any defacing of the exterior of the vehicle or any impairment of the aerodynamics of the vehicle when the vehicle is in motion. The present invention further relates to a protective vehicle cover which can be draped over the vehicle in a manner by which the protective cover is threaded through the gap between the hinged end of an open trunk lid and the rear upper body of the trunk and thereafter spread over the vehicle while the trunk lid is closed, to thereby provide a protective cover which has a portion extending into the locked trunk so that the vehicle cover cannot be removed or stolen and at the same time provides a complete covering for the vehicle. The anti-theft device comprises an interconnecting member which connects a portion of the interior surface of the protective cover and the rotatable retaining member in the trunk, to thereby prevent the vehicle cover from being lifted off and removed by a thief. The interconnecting member extends through the gap located between the top rear of the trunk body and the hinged edge of the trunk lid and extends through this gap even when the lid is closed.

It has been discovered, according to the present invention, that if a retaining means which can accommodate a rewound vehicle cover is placed into the trunk of a vehicle and affixed to a portion of the trunk of the vehicle, the portion being either under the trunk lid or anywhere within the confines of the trunk, in a manner which permits the protective cover to be threaded between the hinges of the trunk lid and between the hinged edge of the trunk lid and the rear body of the vehicle, then the protective cover can be efficiently stored out of sight and easily removed for use to be draped over the vehicle.

It has been further discovered, according to the present invention, that if the undersurface of the protective vehicle cover comprises a joining sheet of material which is connected to a portion of the underside of the vehicle cover at one end and to a retraction mechanism of the retaining means at its other end, then when the cover is draped over the vehicle, it becomes theft proof because the intermediate piece of material which has one end attached to the retraction mechanism which is locked within the trunk prevents the cover from being removed. It has also been discovered, according to the present invention, that if the intermediate piece of material includes woven within it metal fibers such as steel fibers and/or fine chain, or an internal metal sheeting, then it is very difficult to cut the piece of material to remove it from the underside of the cover.

It has also been discovered, according to the present invention, that if the retaining means within the trunk has a retraction mechanism which includes a self rewinding spring, then the vehicle cover can be conveniently folded to be rewound automatically and neatly retained within the retaining means inside the trunk.

It is therefore an object of the present invention to provide a vehicle protective cover which includes an attaching means which causes a portion of the protective cover to be attached to a mechanism locked within the trunk of a vehicle to thereby prevent the protective cover from being stolen.

It is another object of the present invention to provide a system so that a vehicle cover could be easily and simply applied over and removed from the vehicle by only one person without any other help.

It is a further object of the present invention to provide a vehicle cover which is a full sized cover to protect the entire outer surface of the vehicle while at the same time being theft proof.

It is an additional object of the present invention not to alter in any way the vehicle exterior when the vehicle cover is stored, thereby retaining the aesthetics of the vehicle and in no way impairing the aerodynamics of the vehicle.

It is a further object of the present invention to provide a protective cover in which the exterior will be folded in on itself so that the interior portion of the vehicle cover always remains free of the dirt accumulated on the exterior of the vehicle cover.

It is another object of the present invention to provide a protective cover which can be removed from its retaining means so that the cover can be periodically cleaned.

Further novel features and other objects of the present invention will become apparent from the following detailed description, discussion and the appended claims, taken in conjunction with the drawings.

BRIEF DESCRIPTION OF THE DRAWINGS

Referring to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
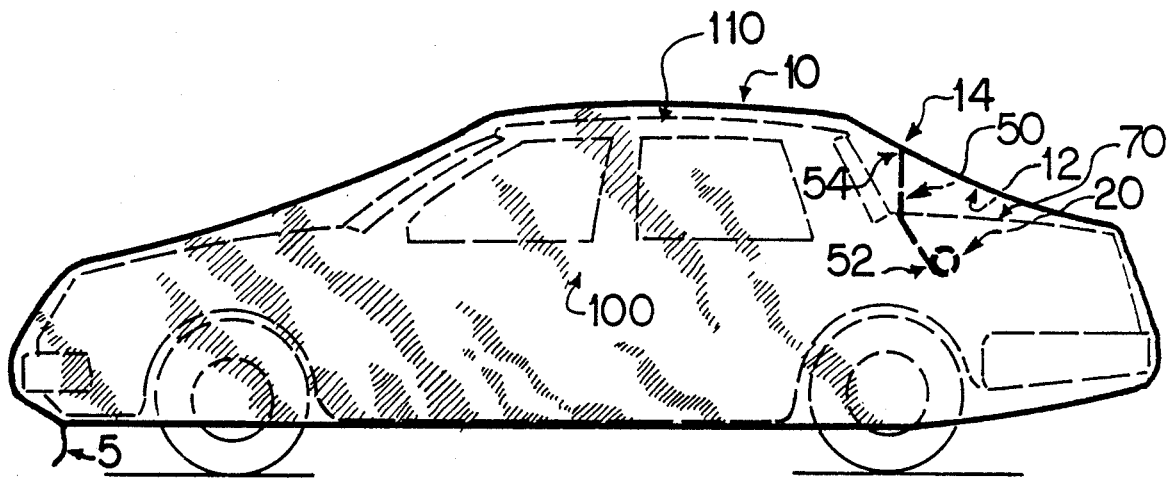
FIG. 1 is a side elevational view of a vehicle with the present invention protective vehicle cover draped over the vehicle and being retained for anti-theft purposes by an intermediate connecting strip extending from the underside of the protective cover to a retaining means retained within a locked trunk of the vehicle, with the vehicle shown in dotted lines and the intermediate connecting strip shown in dotted lines.
Figure 4:
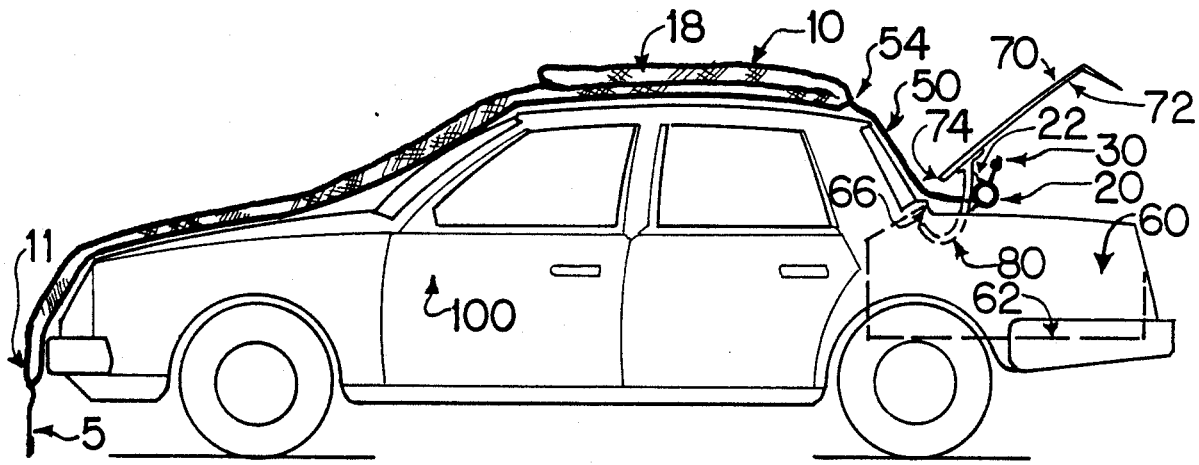
FIG. 4 is a side elevational view of a vehicle with the trunk open to permit the folded protective vehicle cover to be retracted onto the roller within the trunk.
Figure 5:
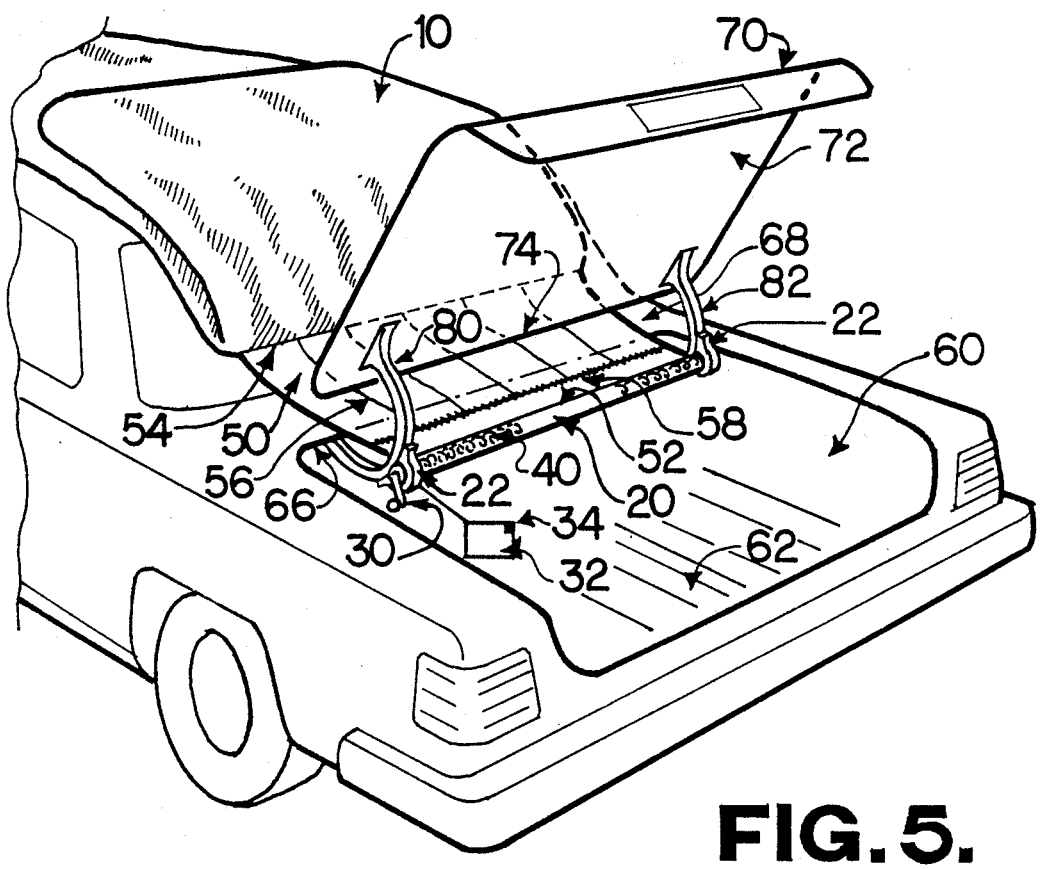
FIG. 5 is a perspective view of a portion of a vehicle with the trunk lid open and the folded protective vehicle cover ready to be rolled into the trunk.

For purposes of illustration, the present invention protective cover assembly will be illustrated in use with a car 100, but it is emphasized that the present invention can be incorporated into use with any vehicle having a trunk. Referring to FIG. 1, there is shown at 10 the protective cover portion of the present invention. The protective cover 10 can be made of any desired material such as synthetic material, cotton, etc. and is dimensioned to fit over the particular car 100 that is to be protected. The protective cover 10 can be made of stretch material so that it can be stretched to fit over the bumpers of the vehicle. Referring to FIGS. 1, 4 and 5, a key element of the present invention is a rotatable retaining means 20 which is set within the trunk 60 of the car 100. The concept is to have the rotatable retaining means 20 retained within the trunk so that it is away from access to a would be thief when the trunk lid 70 is closed. In the illustration of FIG. 4, the retaining means 20 is a rolling rod which is supported by attachments 23 which affix the rolling rod 20 to the interior portion 72 of the lid 70 of the car 100. It is also within the spirit and scope of the present invention to have the retaining means 22 affix the rolling rod 20 to the floor 62 of the trunk 60. In a third embodiment, the rolling rod 20 can be retained by the trunk lid hinges 80 and 82. Regardless of which support attachment means is used to retain the rolling rod 20, the rolling rod is free to rotate in both the clockwise and counterclockwise direction. The retaining means rolling rod 20 further comprises means 30 for activating the rolling rod 20 and causing it to rotate in either the clockwise or counterclockwise direction. In the illustration in FIG. 5, the activating means 30 is a crank handle which is hand operated and can be turned in either direction. Alternatively, an electric motor 32 can be set within the trunk and the flip of a switch 34 can activate the motor 32 and cause it to rotate the roller arm 20 in any desired direction. The roller arm 20 can also retain within it a spring mechanism 40 which is biased when the roller arm 20 is rotated in one direction (for unwinding of the protective cover 10) and can automatically cause the roller arm 20 to be rotated in the opposite (unbiased direction) to rewind the protective cover 10.

The key element of the present invention is an intermediate connecting member 50 having two ends 52 and 54. First end 52 is attached to retaining means roller arm 20, as illustrated in FIG. 5. The second opposite end 54 is permanently connected to the interior surface 12 of protective cover 10 along a line of attachment 14, as best illustrated in FIG. 1. As best illustrated in FIGS. 4 and 5, the intermediate connecting member 50 is threaded between the upper hinged end 74 of trunk lid 70 and the rear upper edge 66 of trunk 60 so that the intermediate connecting member 50 fits through the gap 68 between these two edges when the trunk lid 70 is open. The intermediate connecting member 50 is also a piece of fabric and preferably is made of the same fabric as the protective cover 10. For added security, a multiplicity of steel fibers and/or fine chain 56 can be sewn into the intermediate connecting member 50 to thereby make it difficult to cut. As illustrated in FIG. 5, the intermediate connecting member 50 is dimensioned to fit between the trunk lid hinges 80 and 82 and therefore its width along the roller member 20 should not be longer than the clear space between the two trunk lid hinges 80 and 82. As illustrated in FIG. 1, when the trunk lid 70 is closed, the intermediate connecting member is press fit between the edges 74 and 66 of the hinged end of the trunk lid 70 and top rear of trunk 60 respectively, so that it is taut. The length of intermediate connecting member 50 is dimensioned to be sufficient to permit a relaxed connection between the roller member 20 in the trunk 60 and the protective cover 10 when spread over the vehicle 100.

As illustrated in FIG. 1, the protective cover 10 is sized so as to spread completely over the outer surface of the vehicle 100 to afford maximum protection. The protective cover can be retained along the edge and bumper of the vehicle 100 by conventional well known means such as elastic along the outer edges of the protective cover 10 or cords or strings affixing the edges to the front and rear bumper of the vehicle 100.

Figure 2:
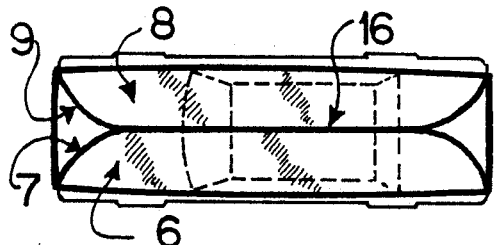
FIG. 2 is a top plan view of a vehicle with the present invention protective vehicle cover being folded longitudinally.
Figure 3:
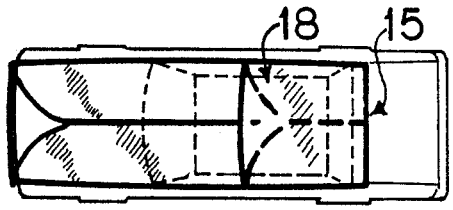
FIG. 3 is a top plan view of a vehicle with the present invention protective vehicle cover double folded and ready to be rolled into the trunk of the vehicle.
Figure 6:
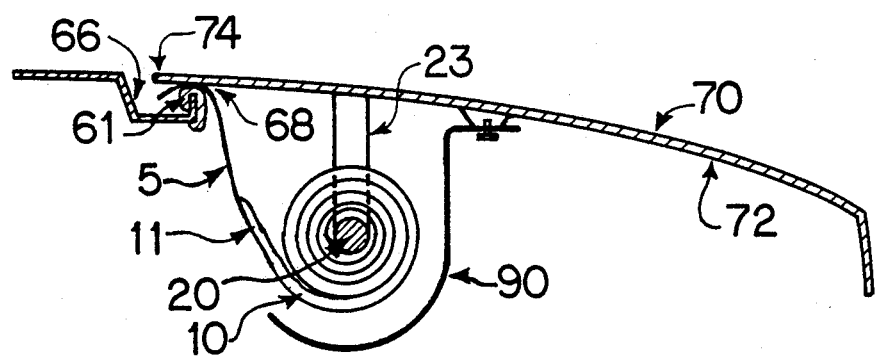
FIG. 6 is a partial cross-sectional view of a vehicle trunk with the protective vehicle cover rolled up on the roller within the vehicle trunk.

To store the protective cover 10 in the trunk 60, the procedure is as follows. Referring to FIG. 2, the sides 6 and 8 respectively of protective cover 10 are folded over the top 110 of the vehicle 100 so that the lateral bottom hems 7 and 9 will meet on a longitudinal median line 16 on top of the vehicle 100. If desired, a few "Velcro"-R type connecting members or snaps along the longitudinal median line 16 of the vehicle cover 10 and along the edges of the lateral bottom hems 7 and 9 can be provided so that when placed in this folded position, the cover portions will not slide relative to one another. Then the back side 18 of the protective cover 100 is folded along the line 15 at the approximate location 14 where the intermediate connecting member 50 is sewn into the underside 12 of the protective cover 10. Once in this position as best illustrated in FIG. 4, the trunk lid 70 is opened and using the activating means such as the crank 30, the retaining means such as the roller arm 20 is caused to rotate in one direction, for example the counterclockwise direction, to wind the protective cover 10 onto the roller member 20. During the rewinding operation, the trunk lid hinges 80 and 82 serve as guides to assure a smooth and even rewinding of the cover onto the roller member. As illustrated in FIG. 6, once fully rewound and with the trunk lid closed, the protective cover 10 is safely stored inside the trunk 60 and does not create any unsightly appearance or burden the aerodynamics of the vehicle. The front end 11 of the cover 10 may comprise a string 5, belt, strap or similar device which is left trapped in the gap 68, adjacent the rubber gasket 61 of the trunk edge 66 and the hinged trunk lid edge 74 when the trunk 70 is closed.

To spread the protective cover 10 over the vehicle 100, the sequence is reversed. The trunk 60 is opened. Then with the help of the pulling strip 5, the protective cover 10 is pulled through the opening and gap 68 between the top edge 66 of the trunk 60 and the hinged edge 74 of the trunk lid 70. The trunk lid hinges 80 and 82 act as guides to assure that the protective cover 10 will be pulled evenly through the gap 68. Once the protective cover 10 is totally unrolled and out of the trunk 60, the trunk lid 70 is closed and the rear side 18 of the protective cover 10 is unfolded over the trunk lid 70. Then the sides 6 and 8 of the protective cover 10 are unfolded so that the full car 100, except the bottom, is covered. With the use of an elastic or normal string in the bottom hems 7 and 9, the cover is secured to the car 100.

An optional addition is the inclusion of a detaching means 58 located along the width of the interconnecting member 50 at a location adjacent the retaining means or roller 20. One such detaching means 58 is a zipper, as illustrated in FIG. 5. When it is desired to clean the protective cover 10, the zipper could unzip the interconnecting member 50 and the protective cover 10 from the retaining means 20 so that the protective cover can be cleaned. In lieu of the zipper, other detaching means such as mating "Velcro"-R members or snaps can be used.

While the preferred embodiment of the interconnecting member 50 is the piece of material, preferably with strengthening material such as steel fibers and/or fine chain sewn into it, other interconnecting members such as straps or strings can be used to connect the interior surface of the protective cover to the retaining means.

Another optional feature is the inclusion of a shroud member 90 (see FIG. 6) which serves to shroud and shield the rolled up protective cover 10 from the remainder of the trunk 60. The shroud 90 serves to prevent the falling in the trunk of dust or dirt which is entrained by the protective cover. The shroud 90 can be attached to the interior of the trunk lid as illustrated in FIG. 6 or to the trunk lid hinges.

Defined broadly, the present invention is an assembly for covering a vehicle having a trunk and a trunk lid including a gap located between the rear end of the trunk lid and the upper top end of the trunk, the trunk lid including a pair of spaced apart hinges, comprising: (a) a protective vehicle cover having an interior surface which lies adjacent to and covers the exterior surface of the vehicle; (b) a rotatable retaining means affixed within the trunk of the vehicle; and (c) an interconnecting member having two ends, with one end attached along a transverse line of the interior surface of said protective vehicle cover and the second end attached to said rotatable retaining means, the interconnecting member extending through the gap located between the hinged end of the trunk lid and the upper top end of the trunk and also in the space between said hinges; (d) whereby when not in use, said protective vehicle cover can be folded up and inserted and retained in said trunk by rotation of said rotatable retaining means causing said vehicle cover to pass through said gap in an opened trunk and when in use, said interconnecting means serves to retain said vehicle cover on said vehicle and prevent theft of the vehicle cover when the trunk is closed.

Defined even more broadly, the present invention is an assembly for covering a vehicle having a trunk and a trunk lid including a gap located between the rear end of the trunk lid and the upper top end of the trunk, the trunk lid including a pair of spaced apart hinges, comprising: (a) means for covering said vehicle; (b) retaining means affixed within the trunk of the vehicle; and (c) means for connecting said means for covering said vehicle to said retaining means which means for connecting extends through the gap located between the rear end of the trunk lid and the upper top end of the trunk and also in the space between said hinges.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An assembly for covering a vehicle having a trunk including a forward upper portion and a trunk lid attached at one end by a pair of spaced apart hinges to the upper top end of the trunk, with a gap located between the end of the trunk lid to which the hinges are attached and the upper top of the trunk and extending between the pair of spaced apart hinges, comprising:
   a. a protective vehicle cover having an interior surface which lies adjacent to and covers the exterior surface of the vehicle;
   b. a rotatable retaining means affixed to said pair of spaced apart hinges and resting within the trunk when the trunk lid is in the closed position and moving with the hinges to an exposed position when the trunk lid is opened; and
   c. an interconnecting member having two ends, with one end attached along a transverse line of the interior surface of said protective vehicle cover and the second end attached to said rotatable retaining means, the interconnecting member extending through the gap;
   d. whereby when not in use, said protective vehicle cover can be folded up and inserted and retained in said trunk by rotation of said rotatable retaining means causing said vehicle cover to pass through said gap in an opened trunk and when in use, said interconnecting means serves to retain said vehicle cover on said vehicle and prevent theft of the vehicle cover when the trunk is closed.

2. An assembly for covering a vehicle in accordance with claim 1 further comprising a shroud attached to said lid for shielding the rotatable retaining means and wound covering means from the remainder of the trunk.

3. An assembly for covering a vehicle in accordance with claim 1, wherein said rotatable retaining means is a rod rotatably attached to said pair of spaced apart hinges.

4. An assembly for covering a vehicle in accordance with claim 3 wherein said rotatable retaining means further comprises activating means for causing rotation of said rod.

5. An assembly for covering a vehicle in accordance with claim 4 wherein said activating means is a crank handle.

6. An assembly for covering a vehicle in accordance with claim 4 wherein said activating means is an electric motor.

7. An assembly for covering a vehicle in accordance with claim 3 wherein said rod further comprises an internal rewind spring.

8. An assembly for covering a vehicle in accordance with claim 1 wherein said interconnecting member is a fabric.

9. An assembly for covering a vehicle in accordance with claim 8 wherein said fabric further comprises strengthening material interwoven into the fabric.

10. An assembly for covering a vehicle in accordance with claim 1 further comprising a pull string located at the end of the covering means which lies adjacent the front of the vehicle.

11. An assembly for covering a vehicle in accordance with claim 1 further comprising detaching means located in said interconnecting means at a location adjacent said rotatable retaining means, whereby said interconnecting means and protective vehicle cover may be detached from said rotatable retaining means.

12. An assembly for covering a vehicle in accordance with claim 11 wherein said detaching means is a zipper assembly.

13. An assembly for covering a vehicle having a trunk including a forward upper portion and a trunk lid attached at one end thereof by a pair of spaced apart hinges to the forward upper portion of the trunk, with a gap located between the end of the trunk lid to which the hinges are attached and the forward upper portion of the trunk and extending between the pair of spaced apart hinges, comprising:
   a. a protective vehicle cover having an interior surface which is positionable adjacent to and can cover the exterior surface of the vehicle;
   b. a rotatable retaining means affixed to said trunk lid and resting within the trunk when the trunk lid is in the closed position and moving with a trunk lid to an exposed position when the trunk lid is opened; and
   c. an interconnecting member having two ends, with one end attached along a transverse line of the interior surface of said protective vehicle cover and the second end attached to said rotatable retaining means, the interconnecting member extending through the gap;
   d. whereby when not in use, said protective vehicle cover can be folded up and inserted and retained in said trunk by rotation of said rotatable retaining means causing said vehicle cover to pass through said gap in an opened trunk and when in use, said interconnecting means serves to retain said vehicle cover on said vehicle and prevent theft of the vehicle cover when the trunk is closed.

14. An assembly for covering a vehicle in accordance with claim 13 further comprising a shroud attached to said lid for shielding the rotatable retaining means and wound covering means from the remainder of the trunk.

15. An assembly for covering a vehicle in accordance with claim 13, wherein said rotatable retaining means is a rod rotatably attached to said trunk lid.

16. An assembly for covering a vehicle in accordance with claim 15 wherein said rotatable retaining means further comprises activating means for causing rotation of said rod.

17. An assembly for covering a vehicle in accordance with claim 16 wherein said activating means is a crank handle.

18. An assembly for covering a vehicle in accordance with claim 16 wherein said activating means is an electric motor.

19. An assembly for covering a vehicle in accordance with claim 15 wherein said rod further comprises an internal rewind spring.

20. An assembly for covering a vehicle in accordance with claim 13 wherein said interconnecting member is a fabric.

21. An assembly for covering a vehicle in accordance with claim 20 wherein said fabric further comprises strengthening material interwoven into the fabric.

22. An assembly for covering a vehicle in accordance with claim 13 further comprising a pull string located at the end of the covering means which lies adjacent the front of the vehicle.

23. An assembly for covering a vehicle in accordance with claim 13 further comprising detaching means located in said interconnecting means at a location adjacent said rotatable retaining means, whereby said interconnecting means and protective vehicle cover may be detached from said rotatable retaining means.

24. An assembly for covering a vehicle in accordance with claims 14 wherein said detaching means is a zipper assembly.

* * * * *